United States Patent [19]

Hall et al.

[11] 4,402,749

[45] Sep. 6, 1983

[54] CEMENTITIOUS COMPOSITIONS WITH EARLY HIGH STRENGTH DEVELOPMENT AND METHODS FOR CONTROLLING SETTING RATE

[75] Inventors: Wm. Cornelius Hall, Central Valley; J. Merriam Peterson, Rock Tavern, both of N.Y.

[73] Assignee: Chemtree Corporation, Central Valley, N.Y.

[21] Appl. No.: 65,618

[22] Filed: Aug. 10, 1979

[51] Int. Cl.$^3$ .............................................. C04B 7/35
[52] U.S. Cl. ..................................................... 106/76
[58] Field of Search .............................. 106/76, 89, 97

[56] References Cited

U.S. PATENT DOCUMENTS

| | | | |
|---|---|---|---|
| 3,335,018 | 8/1962 | Peeler et al. | 106/76 |
| 3,997,353 | 12/1976 | Chervenka et al. | 106/110 |
| 4,050,948 | 9/1977 | Gandy et al. | 106/76 |
| 4,171,985 | 10/1979 | Motoki et al. | 106/76 |

OTHER PUBLICATIONS

Lea et al., The Chemistry of Cement and Concrete, Edward Arnold (Pub.) Ltd., London, 1956, p. 522.
Orchard, Concrete Technology, vol. 1, John Wiley & Sons, N.Y., N.Y., 1973, p. 66.

*Primary Examiner*—James Poer
*Attorney, Agent, or Firm*—Posnack, Roberts, Cohen & Spiecens

[57] ABSTRACT

A composition is supplied for filling pot holes and other types of structural deterioration. The composition consist of hydraulic cement and an alkali metal silicate. The silicate includes a molar ratio of silican dioxide to alkali metal oxide from 0.4 to 4.0. The silicate is in a concentration ranging from 0.2 to 20 percent by weight of the cement. A method is also provided which comprises repairing a deteriorating structure by inserting therein a cementitious composition and controlling the rate of setting of the composition by the inclusion therein of sodium silicate in the molar ratio of silicon dioxide to sodium oxide of from 0.4 to 4.0.

1 Claim, No Drawings

CEMENTITIOUS COMPOSITIONS WITH EARLY HIGH STRENGTH DEVELOPMENT AND METHODS FOR CONTROLLING SETTING RATE

FIELD OF INVENTION

This invention relates to cementitious compositions containing additives used to control development of early high strength and other desirable properties in structural cements and concretes of different types. The invention relates more particularly to the repair of deteriorating structures such as highways, pedestrian lanes, streets, buildings, bridge decks, aircraft runways, and parking lots, and to applications in heavy traffic areas where the ratio of down time to flow of traffic is a very important consideration. The invention relates further to compositions especially adapted to overlay or pot hole repairs.

BACKGROUND & PRIOR ART

Cements, mortars and concretes are widely used throughout the industrial world. Among the more important applications of these materials are those found in the construction field for the building of highways, pavements, aircraft runways, parking lots, floors, foundations, bridges, houses, industrial building, silos, docks and many other structures. The characteristics of the end products vary considerably according to the specific application involved, and many mixes have been formulated to produce the desired effects. An acceleration of the normal rate of strength development at an early age often is sought as a major consideration in an important segment of the general field. The benefits from this property are diversified, such as earlier removal of forms, composition for low ambient temperature, and earlier placement in service of a structure or repair of a structure.

Labor and material cost increases often make repair rather than placement of deteriorating concrete surfaces increasingly attractive. For example, street and highway maintenance is a national disaster in the USA today. According to Federal estimates, fully one-third of the nation's bridges are in a deteriorated condition and a multitude of pot holes need repair in our highways. Part of the problem results from greater demands now imposed on traffic lanes than were designed into these structures when they were built only a few years ago. Rapid repair is especially necessary in high traffic areas of pavements and bridges, where high premium is placed on minimum lane downtime for repair, low cost, least hazard to motorists and repair workers, and the smallest damage to various passing vehicles.

Many patch materials developing early high strengths have been suggested including the following groups: basically portland cements of different types, other chemical-setting cements, hydrated calcium sulfate (gypsum), thermoplastics, thermosetting materials, bituminous materials, sulfur, and composites, with or without various additives. Each has advantages and disadvantages.

Type III portland cement has been quite extensively used for its early high strength characteristics, but the setting time of this cement is slower than often is desired and there is high shrinkage, especially if the water content is not kept low. Also used are high-alumina cements, of the non-calcium aluminate type, but they too have excessive shrinkage, and permit water and deicer penetration, which causes deterioration as a result of corrosive action, or cracking because of ice expansion during the setting stage, which sometimes causes disintegration of the repaired structure.

Polyester resins usually are hardened with very small quantities of catalysts, which often is difficult to control, and some of the epoxy resins bond poorly with damp surfaces. Some of the magnesia-phosphate compositions, sulfur, and solvent asphalt mixtures emit disagreeable vapors which usually are toxic or inflammable.

Many materials and methods have been proposed to control the setting rates of portland cements, including both retarders to extend pot life during emplacement, and accelerators to develop early high strength. Some are added alone, while others are combined with other admixtures.

Included in the list of chemicals that accelerate the hardening of mixtures of portland cement and water are some of the soluble chlorides, hydroxides, carbonates, sulfates and various organic compounds such as triethanolamine.

Calcium chloride probably is the most commonly used accelerator for portland cements in spite of its tendency to increase the corrosion rate of any steel reinforcement which is used, especially in prestressed concrete, because of possible stress corrosion of the prestressed steel. Shrinkage or expansion often are encountered with these mixtures as a result of the alkali aggregate reaction, and these factors often are difficult to control.

In a few publications, sodium silicate or "water glass" has been recommended as an accelerator for the setting of Portland Cement in cases where a "false set" is desired in special cases such as the quick patching of a hole in a cement tank. The "false set" is considered to be an undesirable property in cement accelerators, used in a conventional manner, and is employed only as an expedient in case of an emergency. Because of this bad reputation, there appears to be no reputable study reported concerning the conditions that are necessary in conventional applications for the effective use of silicates in controlled early high strength mortars and concrete.

SUMMARY OF THE INVENTION

As was outlined previously, the solutions of many problems within the scope of this invention involve the control of setting time as related to early strength. The actual setting time desired will differ widely depending upon the specific application. Often of major concern is the tolerance permitted in adverse changes in other properties that are inherently associated with the early high strength desired.

A broad and principle objective of this invention is the production of improved repair compositions for structures and methods for the application thereof.

A more specific objective relates to the use of improved pavement compositions for repair of damaged vehicular traffic lanes to minimize the time traffic is halted for repair. This time interval involves site preparation, emplacement of repair material, and required setting time.

Another objective is to produce a repair material that is compatible with the surrounding material in order to extend the life of the repaired structure.

Another objective is the provision of a regulated-set cement adapted to adjust and compensate for variable conditions encountered in different applications.

Still another objective is to provide a method of overall pavement maintenance at low total cost for both material and labor.

To achieve the above and other objects of the invention, there is provided in accordance with a preferred embodiment thereof a composition comprising a hydraulic cement and an alkali metal silicate, said silicate including a molar ratio of silicon dioxide to alkali metal oxide of from 0.4 to 4.0 and being in a concentration ranging from 0.2 to 20 percent by weight of the cement.

According to one embodiment of the invention, the hydraulic cement may be a portland type cement. According to another specific embodiment, the alkali silicate content may be substantially of sodium silicate.

According to another aspect of the invention, there is provided a composition comprising a portland type cement and a sodium silicate composition, said sodium silicate composition being characterized by a $SiO_2$-$Na_2O$ molar ratio ranging from approximately 0.5 to approximately 3.0 and being in a concentration range of from 0.5 to 15 percent by weight of the total composition.

In accordance with a further aspect of the invention, the cement may include at least member of the group of cementitious materials consisting of pozzolan, fly ash, blast furnace-slag and high alumina cement.

According to still another aspect of the invention, the composition may include at least one admixture from the group consisting of water reducer admixture, defoamer admixtures, thickener admixtures, air-entraining admixtures and expansion-producing admixtures. Moreover the composition may include a metallic fluosilicate.

The type of cement which is employed in accordance with the invention may be a white cement adapted for architectural structures if the deterioration occurs therein. Also if colors are involved, coloring agents may be added to the composition to coordinate therewith. In the event that the deteriorating structure is constructed from bituminous or asphaltic material, agents which color the substance black may be employed. These may include iron additives of the type to be described in greater detail hereinafter. Such iron additives afford additional advantages to the composition.

In further accordance with the invention, the aggregate may be adapted for use in a mortar, grout or concrete. The aggregate will preferably have a particle size smaller than ⅜" and it is further characterized by a particle size distribution in which no more than 10 percent by weight passes a 100 mesh sieve. The aggregate will preferably have a specific gravity greater than 2.5 and may include more than 30 percent based on combined aggregate weight as iron or iron ore concentrate.

According to the method of the invention, provision is made for repairing a deteriorating structure such as a highway or the like by inserting therein a cementitious composition and controlling the rate of setting of the composition by the inclusion therein of a silicate such as an alkali silicate preferably sodium, said silicate including a molar ratio of silicon dioxide or other such oxide to sodium oxide from 0.4 to 4.0 and being in a concentration range of from 0.2 to 20 percent by weight of cement in the composition to which water is added in an amount to produce a slump adapted for insertion.

According to the method of the invention, such deteriorating structures may be repaired as exemplified by bridge decks, parking lots, aircraft runways, buildings, floors, foundations, docks, silos and vehicular or pedestrian traffic lanes.

According to a specific advantageous feature of the method of the invention, the unset surface of the resulting overlay may be sprinkled with a wear resistant aggregate to produce a non-skid surface.

Other objects, features and advantages of the invention will be found in the following detailed description of some preferred embodiments thereof.

DETAILED DESCRIPTION

This invention is based upon studies of many different silicates, alone and in combination with other materials, under various conditions of application. Contrary to expectations, these materials under selective, controlled conditions were proven to have significant merit in the solution of various problems requiring the development of early high strength.

The most important variables considered in these studies involving accelerators include the following:
(1) Ratio of $SiO_2$ to alkali oxide in accelerator mixtures.
(2) Ratio of silicate mixture to binder.
(3) Effect of temperature on the rate of early set.
(4) Use of various other additives in control of rate of early high strength.
(5) Selection of aggregate.

The initial studies were made on small samples of the matrix mixture. Because development of very early high strength was an essential property required for the desired product, a rapid and comparative penetration test was devised to be used as a preliminary screening test for the selection of the more promising compositions. This test invloved the rate at which a round pin with a flat end would penetrate a sample specimen at fixed intervals of time following preparation, at different temperatures. The most promising compositions of these preliminary tests were then subjected to practical field tests, involving the filling of a pot hole, and driving over it with a loaded truck at various time intervals after filling, and observing the tire penetration on the surface of the repaired pot hole. Temperatures were not controlled in these field tests, but the ambient temperatures were noted, and approximate corrections could be made by correlations with results from tests made with small specimen samples cast under controlled conditions.

Other comparative qualitative tests also were made on the setting characteristics of the freshly prepared mortars from the various compositions, at appropriate time intervals. These include the following:
1. Depth of imprint of a weighted diamond plate applied to the surface area.
2. Resistance to the abrasion of a wire brush drawn across the surface of the cast sample.
3. Impact resistance of a hammer striking the surface.
4. Resistance to breakage by hand of similar cast samples.

In the final composite rating of the various compositions, the greatest emphasis was placed upon the direct comparison of the test specimen to a standard portland cement, type I composition, with the omission of the silicate accelerator. Various water-matrix ratios were tested, but most comparisons were made by adding sufficient water to produce a slump of approximately 5 inches.

The results of these tests are summarized as follows:

Using type 1 portland cement, the early high strength characteristics were noted using sodium silicate mixtures with molar ratios of $SiO_2$-NaO varying from about 0.4 to 4. Acceptable results for early set were obtained with these ratios but preferred ratios ranged from about 0.5 to 3. The sodium silicate concentration range varied from about 2.0 to 20% by weight of the portland cement, while the preferred concentration range varied between 0.5 and 15 percent. A trade off between development of early high strength and longer pot life usually is the controlling factor that determines the selection of silicate compositions and concentrations. Workability of the composition and other factors specific to emplacement of the material often require special considerations and further modifications of formulation.

Various sodium silicate compounds of definite molecular composition may be produced by fusing $SiO_2$ and $Na_2CO_3$ in the proper molar ratios, such as the metasilicate ($Na_2SiO_3$), ortho-silicate ($Na_4SiO_4$), sesqui-silicate ($Na_6Si_2O_7$) or $Na_2Si_3O_7$. Some of these compounds may be isolated as hydrates, such as $Na_2SiO_3.9H_2O$. However, any molar ratio of the two oxides may be obtained as a mixture of two or more of these compounds by adjusting the relative quantities of $SiO_2$ and $Na_2O$ in the original fusion mix. As the $SiO_2$-$Na_2O$ ratio increases, both the water solubility and alkalinity of the aqueous solutions decrease. For practical applications in this invention, this ratio should not exceed about 4 because of low water solubility, nor should the ratio be less than about 0.25, when instability of the silicates become troublesome. The dry solid silicates, in anhydrous or hydrated form, may be mixed as a dry solid in the portland cement, or they can be mixed directly with all or part of the mix water used for setting the cement. A low water-cement ratio, preferably less than about 0.5 percent by weight, improves the desired water tightness, which also is achieved by the addition of an air entering admixture. The latter additive also improves workability of the mix. Substitution of potassium silicate for sodium silicate did not change significantly the results, with respect to setting rates.

An increase in temperature increases the rate of early high strength development. The preferred temperature range lies between about 60° and 70° F. At lower ambient temperatures, hot water and hot aggregate may be used to obtain the preferred temperature. At higher temperatures, ice may be added to the mix water to reduce the temperature, in order to avoid a possible undesirable rapid false set of the mixture. Acceptable, but less satisfactory setting rates were obtained at temperatures outside the aforegoing range but between 40° and 80° F.

Substitution of part of the portland cement by other ingredients such as pozzolan, fly ash, blast furnace slag, high alumina cement, and so forth will modify to a degree the rate of setting, and provide a means to modify and control the rate of setting to meet the particular requirements desired for specific applications. Further control of desired properties may be achieved with the inclusion of different amounts of various types of admixtures classified as a water reducer, a defoamer, a thickener, an air-entrainer, an expander, a functional water reducer, a gas foamer, etc.

The presence of the sodium silicate mixtures described in this invention does not change significantly the well known, desirable benefits imparted by these admixtures to the more conventional cementitious compositions. Hence, one or more of these admixtures may be added selectively in appropriate amounts to the sodium silicate compositions to achieve the same general, predictable benefits.

In some cases, the cementitious compositions may be used without the addition of aggregate. However, unless the application requires a very thin layer of patch material, it is advantageous to use an appropriate aggregate with properties to coincide with specifications established for conventional concrete. Various compositions of aggregates presented no special problems for the sodium silicate compositions. Quartz, granite, limestone, dolomite, trap rock (such as basalt) can all be used satisfactorily.

For overlay and pot hole repair applications, studies showed that a hard, dense, durable, wear resistant aggregate, with low water absorption was preferred. A crushed aggregate with sharp edges and corners gave better results than an aggregate that had been eroded by wind or water. Aggregate size distribution to provide a minimum void space, and a sufficient quantity of matrix to slightly more than that required to fill the void space, produced a superior mixture. The following screen size gradation proved very satisfactory.

| Aggregate Screen Analysis | |
|---|---|
| Sieve Size | Percent Passing |
| ⅜" (9.5 mm) | 100 |
| No. 4 (4.75 mm) | 95–100 |
| 8 (2.36 mm) | 80–95 |
| 16 (1.18 mm) | 50–85 |
| 30 (0.6 mm) | 25–60 |
| 50 (0.3 mm) | 10–30 |
| 100 (0.15 mm) | 5–10 |

Aggregate studies included some very high density compositions in addition to the more conventional type aggregates and, in general, the heavier aggregates showed some advantage. Use of hematite, magnetite or iron ore concentrate as the aggregate in the compositions of this invention offer substantial advantages over conventional bulk concrete with respect to many characteristics such as superior thermal conductivity, thermal expansion compatible to that of steel, better bonding to steel, homogenity, low water absorption and ease of placement. These characteristics have special merit when applied to the repair of reinforced concrete structures, especially when thermal cycles exist.

Numerous tests provided that the rates of early high strength in the sodium silicate compositions could be controlled over wide ranges by the proper selection and control of the alkali metal silicates alone. The rate could be acclerated to the point that it occurred before proper placement of the patching material could be made. Thus, the decision of composition selection sometimes depends upon a trade off and optimization of these two opposing factors. Further desirable modification of properties of the composition are achieved through the use of other admixtures as are explained elsewhere.

For pot hole field tests, a certain amount of preparation is required. All loose material should be removed from the hole, and the sides formed by the adjacent pavement should be clean. This can be facilitated by the use of a high pressure air or water jet. If necessary, the hole should be deepened to at least two or more inches. Undercutting of the side walls or at least vertical sidewalls is preferred, provided it can be done without cracking or weakening the remaining side wall. Vibration or tamping of the patching material into the hole to eliminate voids and provide better bonding to the sides is generally beneficial. On the other hand, surprisingly good results were obtained with minimum preparation, and a minimum of required equipment. In some cases, the dry ingredients with the mixing water were mixed directly in the pot and this procedure eliminated part of the disadvantage of short pot life.

Some pot holes were road tested satisfactorily commencing within five minutes of the time they were filled, although a time interval of 15 min. after filling was the target criteria. In many tests, there was no sign of a tire imprint left on the patch. Tests also indicated that, in most cases, left expectancy of the patching sodium silicate compositions equaled that of the surrounding pavement, although the ultimate strength was sometimes moderately reduced as the setting rate was increased.

The strength of the bond between the sodium silicate compositions and bituminous or asphalt pavements was unexpectedly and surprisingly high. In several cases, this bond appeared to be nearly as good as was found in concrete pavements.

Often it is desirable to modify the color of the patching composition to more nearly match the color of the surrounding structure. This situation is especially desirable in cases involving the repair of black asphaltic or bituminous traffic lanes. The solution to the problems lies in the addition of a stable pigment or coloring admixture to the patching composition prior to the addition of mixing water to the dry mixture. For black traffic lanes, such stable pigments as carbon black, black iron oxide or mineral black may be used effectively. Various other colored pigments may be used for other colored structures such as floors, patios or swimming pools.

An additional important advantage noted in the use of silicate accelerators to this invention is a significant decrease of water penetration into the set composition. Water penetration is a very serious problem in many applications because penetration of water into the structure causes cracking when the penetrating moisture expands upon freezing. Water penetration also permits corrosive solution of various sources, especially deicers, to deteriorate steel reinforcing members of the structure, and these solutions also sometimes cause deterioration of the concrete itself. The silicate mixes used as an accelerator also act as a sealant. In addition, they also harden the surface to improve its wear characteristic.

The addition of sodium fluosilicate in concentrations from about 0.5 to about 5.0 percent by weight of the matrix further decreases the amount of water penetration of the silicate compositions. Additions of magnesium and zinc fluosilicate or mixtures thereof also improve hardening and binding characteristics.

While portland concrete finds increased architectural acceptance and, in certain applications, the sodium silicate accelerator may be useful for the early removal of casting forms in the construction of such structures. The design oriented selection of colored aggregate may enhance the beauty of the structure, and white titanium oxide or other colored pigment may be added to produce a wide variety of desirable color effects.

An improved, non-skid surface, with good wear resistance may be produced from the silicate compositions by sprinkling a hard powdered grit on the surface of a base or overlay before the surface is hardened. Many materials may be used for this purpose such as silicon carbide, aluminum oxide, boron carbide, boron nitride or industrial diamonds. The use of a mixture of equal volumes of the grit and the base matrix material often improves the bonding action of the grit to the surface. This type of non-skid surface has many interesting applications such as floors, walkways, ramps, stairs and other domestic and industrial traffic lanes.

The preceeding description and examples cited merely illustrate the scope of the study made. This invention in its broader aspects is not limited to the specific compositions, methods, processes and steps described herein. Departures may be made therefrom within the scope of the accompanying claims without departing from the principles of the invention and without sacrificing the chief advantages.

Many different compositions establish the wide variations in formation available to control the desired setting rate and other characteristics for adaptation of this invention to selective applications. The invention is illustrated by the examples in the following table.

Compositions Showing Effect of $SiO_2/Na_2O$ Molar Ratio and Silicate/Matrix Ratio on Relative Setting Rates*

| Example No. | $SiO_2/Na_2O$ (Molar Ratio) | Silicate/ Matrix (Weight %) | Aggregate | Other Additive | Rating** |
|---|---|---|---|---|---|
| 1 | 0.4 | 0.2 | — | — | 3 |
| 2 | 0.4 | 10 | — | — | 3 |
| 3 | 0.4 | 20 | — | — | 2 |
| 4 | 0.5 | 0.5 | — | — | 2 |
| 5 | 0.5 | 5 | — | — | 2 |
| 6 | 0.5 | 20 | — | — | 2 |
| 7 | 0.5 | 10 | — | a | 2 |
| 8 | 1.0 | 0.2 | — | — | 3 |
| 9 | 1.0 | 5 | — | b e | 1 |
| 10 | 1.0 | 15 | — | — | 1 |
| 11 | 1.0 | 10 | c | e | 1 |
| 12 | 2.0 | 0.5 | — | — | 2 |
| 13 | 2.0 | 1.0 | — | — | 2 |
| 14 | 2.0 | 15 | — | — | 1 |
| 15 | 2.0 | 10 | d | d | 1 |
| 16 | 3.0 | 0.2 | — | — | 3 |
| 17 | 3.0 | 5 | — | — | 2 |
| 18 | 3.0 | 15 | — | — | 2 |
| 19 | 4.0 | 1.0 | — | — | 3 |
| 20 | 4.0 | 10 | — | — | 3 |

-continued

Compositions Showing Effect of SiO$_2$/Na$_2$O Molar Ratio and Silicate/Matrix Ratio on Relative Setting Rates*

| Example No. | SiO$_2$/Na$_2$O (Molar Ratio) | Silicate/ Matrix (Weight %) | Aggregate | Other Additive | Rating** |
|---|---|---|---|---|---|
| 21 | 4.0 | 20 | — | — | 3 |

*Tests made using Type I portland cement in a temperature range from 65° F. to 75° F. with sufficient water addition to produce a 5 inch slump.
**Ratings based largely upon time required for the composition to develop a comparable 24 hour strength for conventional concretes:
Rating 1 less than 4 hours
Rating 2 between 4 hours and 12 hours
Rating 3 between 12 hours and 20 hours
Footnotes
a Twenty percent of the portland cement was replaced successively by pozzolan, blast furnace-slag and high alumina cement. All three compositions were rated 2, although slightly increasing setting rates were noted in the order in which the substitutions are listed.
b Additions of sodium, magnesium and zinc fluosilicates, alone or in combinations, in concentrations by weight in the range of 0.2 to 2.0 percent further increased setting rates.
c Addition of small aggregate ranging in screen size from ⅜" to 100 mesh, to the matrix compositions improved the physical strength of the set compositions, when the matrix-aggregate ration was adjusted to include a slightly greater volume of matrix than that required to completely fill the void space of the aggregate used, based upon studies including sand, dolomite, limestone, granite, quartz and trap rock, iron ore concentrate, hemitite and magnetite. For many applications involving physical stability, the higher density aggregates are preferred, as are screen size distributions that minimize void volume. Hardness, and sharp surfaces also are desired characteristics of the aggregate. For applications involving larger quantities of these compositions, larger sized aggregates may be used advantageously. Excellent results were obtained with iron oxide concentrate aggregate, containing more than 90% Fe$_2$O$_3$ by weight, with mixtures containing as high as 80% by weight of this aggregate based upon the total weight of the composition.
d A mixture containing equal volumes of sharp grit and dry matrix was sprinkled uniformly on the unset surface of this composition, adapted for use as an overlay, shortly after emplacement, and the composite composition was allowed to dry. The result was a non-skid, wear resistant surface. Screen size and type of grit are not critical factors in this application.
e Studies were made to determine whether the sodium silicate content of these compositions would affect significantly the expected results obtained by the addition of various admixtures to mortars and concrete. Examples of these studies are as follows:

| Admixture | Type | Weight % of Matrix (Range) |
|---|---|---|
| Thickener | Soluble cellulose gum | 0.2–2.0 |
| Defoamer | Dibutyl phthalate | 0.1–2.0 |
| Functional water reducer | Melamine acid Lignosulfonic acid | 0.2–2.0 |
| Air-entrainer | wood resin | 0.2–3.0 |
| Gas-former | Aluminum powder | 0.01–0.02 |
| Expander | Iron powder | 0.01–0.02 |

Results of these studies show that the sodium silicate content of these compositions do not produce secondary effects that are detrimental to the desired effects expected from the use of such admixtures in conventional mortars and concretes.

What is claimed is:

1. A composition comprising a portland type cement, a metallic fluosilicate, and a sodium silicate composition, said sodium silicate composition being characterized by a SiO$_2$-Na$_2$O molar ratio ranging from approximately 0.5 to approximately 3.0 and being in a concentration range of from 0.5 to 15 percent by weight of the total composition.

* * * * *